United States Patent [19]

Erkfritz

[11] Patent Number: 4,470,731
[45] Date of Patent: Sep. 11, 1984

[54] MILLING CUTTER WITH ADJUSTABLE FINISHING INSERT

[75] Inventor: Donald S. Erkfritz, Clarkston, Mich.

[73] Assignee: General Electric Company, Detroit, Mich.

[21] Appl. No.: 281,374

[22] Filed: Jul. 8, 1981

[51] Int. Cl.³ .................................................. B23C 5/24
[52] U.S. Cl. ........................................ 407/38; 407/36; 407/46
[58] Field of Search ............................. 407/36–39, 407/42, 44–46, 48, 81, 83, 88, 89, 103, 104, 40, 33

[56] References Cited

U.S. PATENT DOCUMENTS

| | | | |
|---|---|---|---|
| 3,354,526 | 11/1967 | Erkfritz | 407/40 |
| 3,371,397 | 3/1968 | Coleshill et al. | 407/48 X |
| 3,818,562 | 6/1974 | Lacey | 407/48 X |
| 4,194,860 | 3/1980 | Hopkins | 407/36 X |

FOREIGN PATENT DOCUMENTS

| | | | |
|---|---|---|---|
| 22183 | 2/1977 | Japan | 407/48 |
| 600977 | 6/1978 | Switzerland | 407/89 |
| 466990 | 4/1975 | U.S.S.R. | 407/44 |
| 0580951 | 11/1977 | U.S.S.R. | 407/44 |

Primary Examiner—William R. Briggs
Assistant Examiner—Lawrence H. Meier
Attorney, Agent, or Firm—Hedman, Gibson, Costigan & Hoare

[57] ABSTRACT

The subject invention relates to an improved assembly for mounting a finishing insert in a milling cutter. More particularly, the subject invention facilitates the adjustment of the tilt of a finishing insert relative to a milling cutter to improve the finish of a workpiece. In accordance with the subject invention, a milling cutter is provided with a finishing insert pocket having a planar bottom wall disposed at an inclined angle relative to the planar surface of the cutter. A locating seat, having a finishing insert fixedly mounted therein, is adjustably mounted within the insert pocket. By adjusting the position of the locating seat relative to the insert pocket, the angle of the cutting edge of the finishing insert, relative to the milling cutter is varied. In a preferred embodiment of the subject invention, both the insert pocket and the locating seat include complimentary arcuate walls to provide additional support during the cutting operation.

10 Claims, 5 Drawing Figures

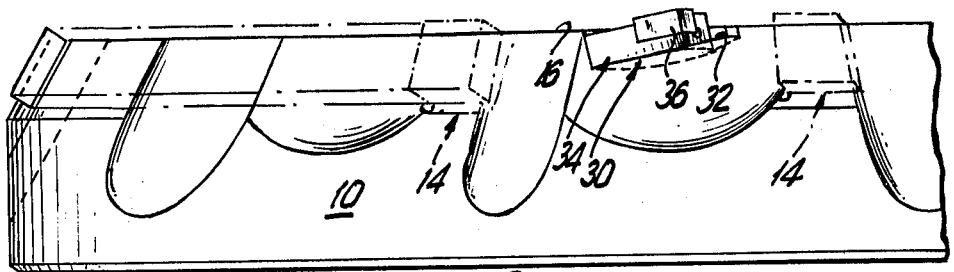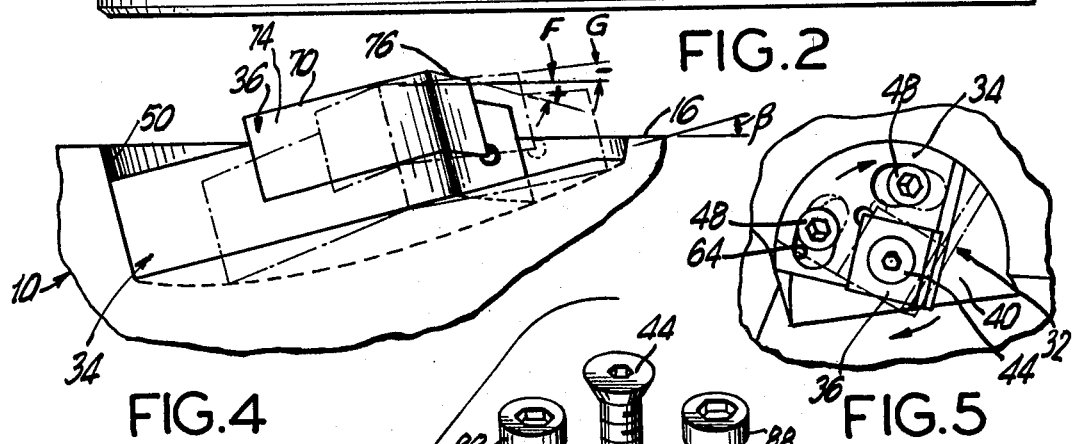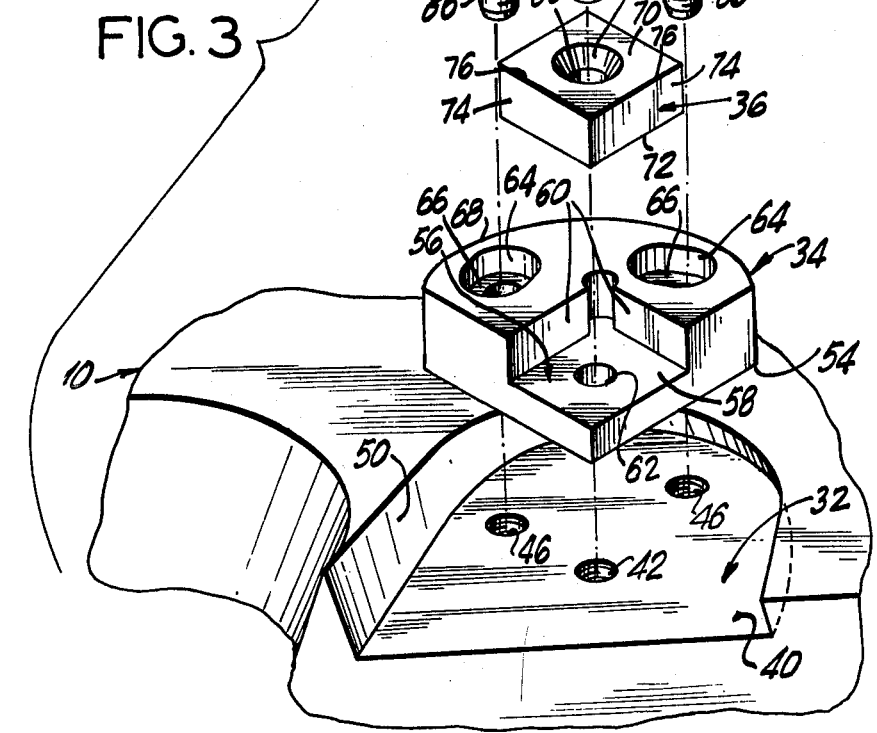

MILLING CUTTER WITH ADJUSTABLE FINISHING INSERT

BACKGROUND OF THE INVENTION

The subject invention relates to an adjustable finishing insert assembly for use with a milling cutter. More particularly, an improved assembly is disclosed which facilitates the adjustment of the angle of a finishing insert relative to a milling cutter to improve the finish of the workpiece.

In the production of a metal article, a variety of machining techniques are used. One prior art technique utilizes a rotatable milling cutter for machining the desired configuration in a piece of metal. The equipment for a milling operation includes a generally cylindrical milling cutter having a planar cutting surface. A plurality of indexable cutting inserts, formed from wafers of hard cutting material, are disposed about the periphery of the cutter, adjacent the cutting surface. The milling cutter is adapted to be rotated about its longitudinal axis by a powered spindle.

In a typical machining operation, the milling cutter is rotated at high speed and a workpiece is moved past the cutter on a motorized feed table. The assembly is adjusted such that as the workpiece is moved past the cutter, a relatively thin layer of metal will be machined off the piece.

In many milling operations, especially those utilizing high volume, special purpose machines, the milling cutter is tilted relative to the workpiece such that the tail end of the cutter is spaced away from the workpiece. The tilting or heeling of the cutter is necessary to prevent those portions of the workpiece already machined by the front end of the cutter, from being scratched or otherwise damaged by the inserts on the tail end of the cutter.

The requirement of tilting the cutter to prevent damage to workpieces unfortunately gives rise to another problem. More specifically, in order to machine a smooth finished cut, it is necessary to address a flat cutting edge of an insert parallel to the workpiece. As can be appreciated, when the cutter is tilted, the angle of the cutting edges of the fixedly mounted inserts are canted relative to the workpiece, such that a scalloped or saw-toothed surface profile is generated.

Various methods have been devised to negate the saw-toothing effect created by the spindle tilt. For example, the insert pockets can be initially manufactured to compensate for a specific spindle tilt. However, this method is undesirable since the latter type of cutter can only be successfully used in a machining operation where the specifically designed tilt is suitable. Another method which has been utilized includes the provision of a finishing insert having an elliptically shaped cutting edge. In theory, as the spindle tilt of the cutter is changed, a different portion of the elliptical cutting edge of the finishing insert comes into contact with the workpiece. This method has been successful in reducing the scalloped effect on the workpiece. However, in some applications, even minor surface imperfections are unacceptable and it becomes necessary to address a flat cutting edge of an insert parallel to the workpiece.

Accordingly, it is an object of the subject invention to provide a new and improved milling cutter having a finishing insert which can be readily adjusted to compensate for the effects of spindle tilt.

It is another object of the subject invention to provide a new and improved milling cutter having a unique finishing insert assembly which can be readily adjusted to vary the angle of the finishing insert relative to the milling cutter to improve the finish on the workpiece.

It is a further object of the subject invention to provide a milling cutter having a new and improved adjustable finishing insert assembly which can be readily adjusted to insure that a flat cutting edge of the finishing insert is properly addressed to the workpiece thereby insuring a smooth surfaced profile.

SUMMARY OF THE INVENTION

In accordance with these and many other objects, the subject invention provides for an improved milling cutter having an adjustable finishing insert assembly. The milling cutter is generally cylindrical in configuration and is rotatable about its longitudinal axis. The cutter includes a plurality of indexable cutting inserts mounted about the periphery thereof, adjacent the planar surface of the cutter.

In accordance with the subject invention, the milling cutter further includes a finishing insert pocket spaced inwardly from the periphery thereof. The finishing insert pocket includes a planar bottom wall which is disposed at an inclined angle relative to the planar surface of the cutter. Preferably, the insert pocket is provided with an arcuate back wall disposed transverse to the planar bottom wall thereof.

A unique finishing insert locating seat is mountable in the insert pocket. The locating seat includes a planar bottom surface which abuts the inclined planar bottom wall of the insert pocket. In the preferred embodiment, the locating seat includes an arcuate back wall, having a configuration complimentary to the arcuate back wall of the insert pocket. A finishing insert formed from a flat wafer of cutting material and having a polygonal configuration, is fixedly mounted within a recess formed in the locating seat. In accordance with the subject invention, the locating seat is adjustably mounted within the insert pocket. More particularly, a mounting means is provided which enables the locating seat to be mounted at various locations relative to the insert pocket. Due to the cooperation between the locating seat and the inclined bottom wall of the insert pocket, by varying the position of the seat within the pocket, the angle of the cutting edge of the finishing insert relative to the milling cutter is varied. By this arrangement, the angle of the finishing insert is readily adjustable to compensate for any desired spindle tilt.

Further objects and advantages of the subject invention will become apparent from the following detailed description taken in conjunction with the drawings.

BRIEF DESCRIPTION OF THE DRAWINGS

FIG. 2 is a partial side elevational view of a milling cutter illustrating the new and improved adjustable finishing insert assembly of the subject invention.

FIG. 3 is an exploded perspective view illustrating the components of the new and improved adjustable finishing insert assembly of the subject invention.

FIG. 4 is an enlarged side elevational view of the adjustable finishing insert assembly of the subject invention, with the rotational movement of insert seat being exaggerated for purposes of clarity.

FIG. 5 is an enlarged top plan view illustrating the adjustability of the finishing insert assembly of the subject invention.

DESCRIPTION OF THE PREFERRED EMBODIMENT

Figure 1:
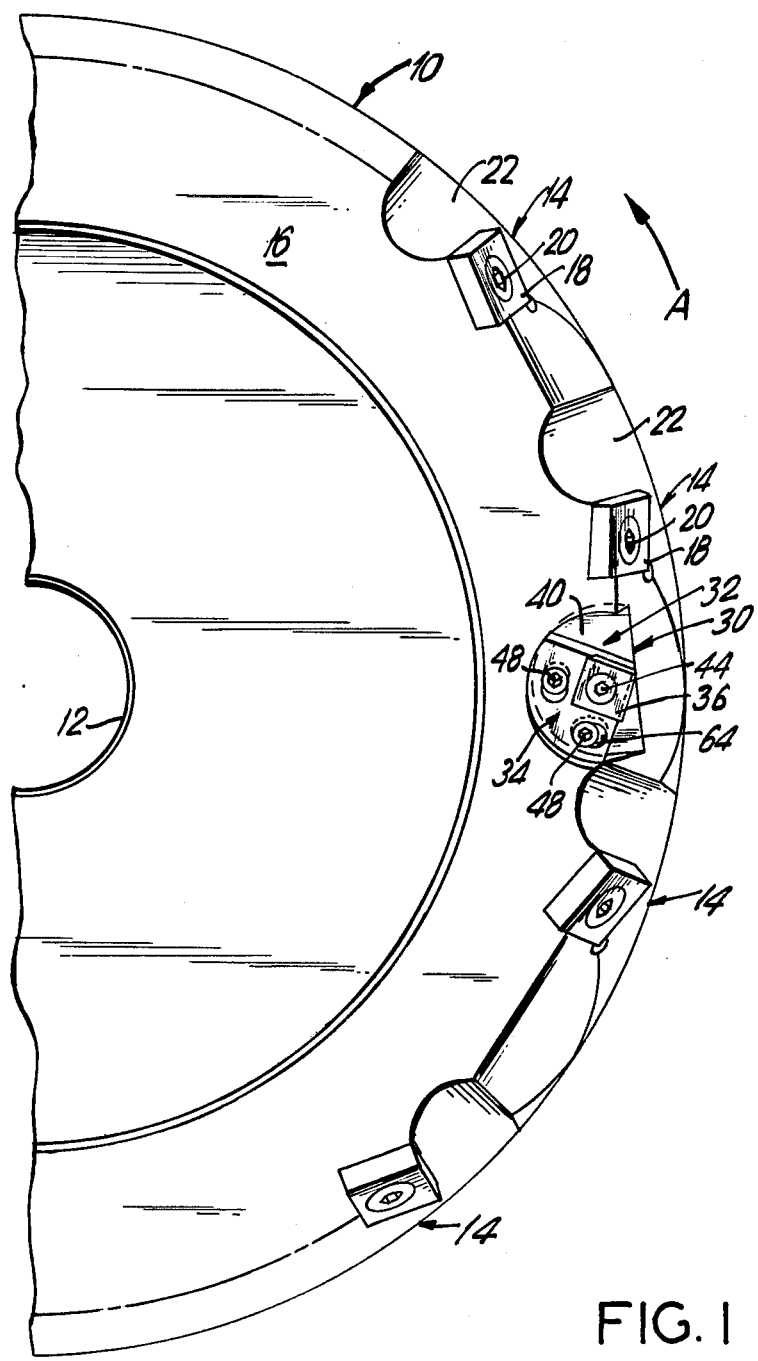
FIG. 1 is a partial, top plan view of a rotatable milling cutter illustrating the new and improved adjustable finishing insert assembly of the subject invention.

Referring to FIG. 1 there is illustrated a fragmentary view of a milling cutter 10 adapted to machine a metal workpiece. The milling cutter 10 is generally cylindrical in configuration and is rotatable about its central axis 12. Milling cutter 10 is provided with a plurality of stations 14 disposed about the periphery of the cutter adjacent the planar cutting surface 16 thereof. In a standard milling cutter having approximately a 13 inch diameter, typically 12 cutting stations are provided, spaced about the periphery thereof at approximately equal intervals. Each cutting station 14 includes an indexable cutting insert 18 fixedly mounted therein. Each insert 18 is formed from a flat wafer of cutting material such as hardened tungsten carbide, and is generally polygonal in configuration. Screws 20 are provided passing through a central aperture in each insert and engaged with the cutter for fixedly mounting the insert thereto. Preferably, each station 14 further includes a chip controlling recess 22 disposed in front of the leading edge of the insert. The cutter 10 is adapted to be rotated in a counterclockwise direction as illustrated by arrow A in FIG 1.

In accordance with the subject invention, milling cutter 10 is provided with an adjustable finishing insert assembly 30 formed on the cutting surface 16 thereof. Referring also to FIGS. 2 and 3, it will be seen that the insert assembly 30 includes a cartridge pocket 32, spaced radially inwardly from the periphery of the cutter 10, and adapted to receive a finishing insert cartridge 34. A finishing insert 36 is fixedly mountable to the insert cartridge 34. In accordance with the subject invention, insert cartridge 34 is adjustably mountable within cartridge pocket 32. By varying the position of insert cartridge 34 relative to cartridge pocket 32, the angle of the cutting edge of the insert 36 may be varied relative to the surface 16 of the milling cutter, as described more fully hereinbelow.

Cartridge pocket 32 includes a generally planar floor 40 which, as illustrated in FIG. 4, is disposed in an angle B relative to the planar cutting surface 16 of the milling cutter. Preferably, angle B is on the order of 10°. Floor 40 of cartridge pocket 32 includes a first threaded aperture 42 for receiving an insert mounting screw 44. A pair of threaded apertures 46 are formed in floor 40 for receiving seat mounting screws 48. In the preferred embodiment of the subject invention, cartridge pocket 32 includes an arcuate rear wall 50 extending approximately 180° around the planar floor surface.

In accordance with the subject invention, cartridge 34 is adjustably mounted within cartridge pocket 32. Cartridge 34 includes a planar bottom surface 54 which is adapted to rest on the planar floor 40 of the cartridge pocket 32. A recess 56 is formed in cartridge 34 to facilitate the mounting of insert 36. Recess 56 includes an insert floor 58 and two upstanding locating rails 60. Rails 60 are disposed in perpendicular relationship and are provided to support two sides of the finishing insert 36. Floor 58 of recess 56 includes a through aperture 62, disposed to be substantially in alignment with aperture 42 of pocket 32, to facilitate the mounting of the insert 36 to the cartridge 34.

Cartridge 34 further includes a pair of elongated apertures 64 for receiving cartridge mounting screws 48. As seen more clearly in FIG. 5, each elongated aperture 64 is slightly arcuate in configuration. Each aperture 64 is located such that when the assembly is adjusted, by rotating cartridge 34 about a pivot point defined by screw 44, each aperture 64 will remain aligned with the associated threaded aperture 46 formed in pocket 32. Each aperture 64 includes a transverse shelf portion 66 adapted to engage a portion of screw 48 to enable the cartridge 34 to be locked into position, as described more fully hereinafter. In the preferred embodiment of the subject invention, the rear wall 68 of cartridge 34 is arcuate in configuration and complimentary to the arcuate configuration of rear wall 50 of cartridge pocket 32. The complimentary arcuate configuration of walls 50 and 68 cooperate to facilitate the adjustment of the seat and provide structural support during machining.

Finishing insert 36 is formed from a flat wafer of cutting material, such as tungsten carbide, and has a generally polygonal configuration. Insert 36 is defined by a pair of opposed planar edge surfaces 70 and 72, with a plurality of rake faces 74 extending therebetween. The juncture between the rake faces 74 and the opposed planar edge surfaces 70, 72, define the cutting edges 76 of the insert. Insert 36 includes a central hole 80 having a chamfered upper edge 82 to facilitate mounting. In the preferred embodiment of the subject invention, insert 36 is generally square in configuration. When insert 36 is mounted within cartridge 34, two rake faces 74 thereof are disposed in abutting relationship with the planar locating rails 60 of recess 56. The interengagement between the locating rails and the edge faces of the insert functions to support the insert during the cutting operation and to spatially locate the insert relative to the cartridge 34.

The subject assembly is mountable to the milling cutter 12 via a plurality of screws 44 and 48. More particularly, screw 44 is intended to affix the insert 36 within recess 56 of cartridge 34. In use, screw 44 is passed through the aligned holes 80 and 62 in the insert and cartridge respectively, and is engaged in threaded aperture 42 in cartridge pocket 32. After the screw 44 is engaged but before it is fully tightened, the screw 44 functions as a pivot point about which the cartridge 34 may be rotated for adjustment. Once screw 44 is fully seated and tightened, it functions to lock the insert 36 securely into recess 56, with a pair of rake faces 74 thereof tightly abutting the locating rails 60 of the seat.

Cartridge 34 is adjustably mounted in cartridge pocket 32 via screws 48. In a preferred embodiment of the subject invention, each screw 48 includes a longitudinally extending shaft portion 86 formed integrally with a head portion 88. Head portion 88 extends radially outwardly beyond the dimensions of the shaft 86. Screws 48 are mountable through apertures 64 and are engaged in the aligned threaded apertures 46 of cartridge pocket 32.

After having described the components of the subject invention, their assembly in the milling cutter 10 will be fully disclosed. Initially, cartridge 34 is mounted in cartridge pocket 32, with the bottom surface 54 thereof abutting the inclined floor 40 of the cartridge pocket. Cartridge 34 is placed within the cartridge pocket in a manner such that the respective mounting apertures are in an aligned orientation. Further, the complimentary arcuate surfaces 50, 68 are disposed in abutting, slidable relationship.

Thereafter, indexable finishing insert 36 is mounted within the recess 56 of cartridge 34, with the mounting hole 80 thereof aligned with the hole 62. The position of insert 36, relative to the cartridge is fixed by passing screw 44 through aligned apertures 80 and 62. Screw 44 is engaged in threaded aperture 42 of cartridge pocket 32. As discussed above, two rake faces 74 of insert 36 are disposed in abutting relationship with rails 60 of cartridge 34 thereby providing support and spacially locating the insert.

Until screw 44 is fully tightened, the position of cartridge 34 can be readily adjusted within pocket 32. More specifically, cartridge 34 can be rotated, with screw 44 functioning as a pivot. Prior to the adjustment of cartridge 34, it is preferable to mount screws 48 through apertures 64 and into the aligned threaded apertures 46 of pocket 32. Once the cartridge is adjusted, as explained below, it is then relatively easy to fully tighten all the screws, thereby fixing the position of cartridge 34 relative to cartridge pocket 32. More specifically, screws 48 may be tightened, such that the heads 88 thereof, securely abut the shelves 66 formed in each aperture 64. Thus, as the screw is fully seated, the pressure of the head 88 of of each screw 48 against the associated shelf 66 functions to drive the cartridge 34 into secure engagement with the cartridge pocket 32.

In accordance with the subject invention, it is intended that the position of cartridge 34 relative to the cartridge pocket 32 be accurately adjusted prior to the final tightening of the screws. More particularly, and as illustrated in FIG. 5, prior to the tightening of screws 44 and 48, cartridge 34 is capable of rotation about the pivot point defined by screw 44. The rotation of the cartridge relative to the cartridge pocket is further guided by the cooperation between the arcuate rear walls 50 and 68, thereof. As discussed above, since each aperture 64 is elongated and slightly arcuate in configuration, they remain aligned with the threaded apertures 46 throughout the complete rotational movement of the cartridge 34.

The effect of the adjustment of the cartridge 34 relative to cartridge pocket 32 can best be appreciated by referring to FIG. 4. In the latter figure, the insert is shown in a first position, (solid lines) and in a second position (phantom lines) after being rotated in a clockwise direction. The rotation of the cartridge 34 has been exaggerated for purposes of illustration. Generally, in some milling operations, the tail end of the milling cutter 10 is canted upwardly away from the workpiece. Accordingly, in order to produce a smooth surfaced finish it is desirable to cant a finishing insert at a complimentary angle to compensate exactly for the spindle tilt, such that a flat cutting surface is addressed to the workpiece. The subject invention thus provides a ready means for adjusting the tilt of the finishing insert to compensate for the spindle tilt of the milling cutter 10.

As illustrated in FIG. 4, when cartridge 34 is disposed in the first position (solid lines) the cutting edge 76 of the insert 36 is disposed at an angle F, i.e., a positive dish with respect to the surface 16 of the milling cutter. As the cartridge 34 is rotated in the clockwise direction towards the second position (phantom lines), this angle is correspondingly increased. In the full clockwise orientation (phantom lines) an angle G is defined, i.e., a negative dish with respect to the surface 16.

In use, after the optimum spindle tilt for the particular application is determined, cartridge 34 can be positioned such that the angle defined between the cutting edge 76 of the insert and the surface of the cutter exactly compensates for the spindle tilt. More specifically, the user merely rotates cartridge 34 within the pocket 32 until the desired, cant is achieved. The abutting arcuate walls 50 and 68 cooperate to guide the movement of the seat during rotation. Thereafter, screws 44 and 48 are tightened locking the cartridge 34 in the desired position relative to the pocket. As noted above, the tightening of screw 44 will seat and lock the insert 36 within recess 56 of cartridge 34. The pressure of the head 88 of each screw 48 on shelf 66 of aperture 64 functions to securely tighten the seat in the desired position within the cartridge pocket 32.

In operation, when a cutting edge 76 of insert 36 becomes worn, the machinist merely has to loosen screw 44 an amount sufficient to permit the rotation on indexing of the insert thereby exposing a fresh cutting edge. Thereafter, screw 44 is retightened, fixing the location of the insert relative to cartridge 34. Accordingly, an insert can be indexed or even replaced without having to loosen screws 48 thereby changing the position of the seat relative to the pocket. Thus, the desired angle of the insert is maintained throughout the milling operation. Of course, if it is desired to change the angle of the insert, screws 44 and 48 are merely loosened enabling the cartridge to be rotated relative to the pocket to achieve a new dish angle.

In summary, there is provided a new and improved milling cutter having an adjustable finishing insert assembly. More particularly, an insert assembly is disclosed which facilitates the adjustment of the dish angle of finishing insert 36 relative to the dish surface 16 of a milling cutter 10. The subject invention includes a cartridge pocket 32 spaced radially inwardly from the periphery of a milling cutter. The pocket 32 is provided with a planar floor 40 disposed at an angle relative to the planar surface of the milling cutter. A cartridge 34 having a planar bottom surface 54 is adjustably mountable in the cartridge pocket. A recess 56 is provided in the cartridge for fixedly mounting a finishing insert 36. In accordance with the subject invention, the position of the cartridge may be adjusted relative to the pocket. Due to the configuration of the subject assembly, the position of the cartridge defines the dish angle of the insert relative to milling cutter. By accurately adjusting the dish angle of the cartridge, the user can compensate for the tilt of the spindle and the dish angle requirements of the finishing insert, thereby insuring a smooth surfaced profile during machining.

The above mentioned patents and/or publications are incorporated herein by reference. Obviously, other modifications and variations of the present invention are possible, in the light of the above teachings. It is therefore, to be understood that changes may be made in the particular embodiments of the invention described which are within the full intended scope of the invention as defined by the appended claims.

I claim:

1. A milling cutter having an adjustable finishing insert assembly, said milling cutter being generally cylindrical in configuration having a planar cutting surface, said milling cutter being rotatable about its longitudinal axis, said cutter having a plurality of indexable cutting inserts mounted around the periphery thereof adjacent the cutting surface, said assembly for adjusting the angle of said finishing insert relative to said cutting surface of said milling cutter thereby insuring that a flat cutting edge of the finishing insert may be addressed to the surface of a workpiece in order to provide a smooth cutting profile, said milling cutter comprising:
- a cartridge pocket formed on said cutting surface of said milling cutter and spaced radially inwardly from the periphery thereof, said cartirdge pocket including a floor, said floor being planar and disposed at an inclined angle on the order of 10° relative to said planar cutting surface;
- a finishing insert formed from a flat wafer of cutting material and having a polygonal configuration in plan, and at least one flat cutting edge;
- a finishing insert cartridge mounted in said cartridge pocket, said cartridge having a planar bottom surface abutting said floor of said cartridge pocket, said cartridge having a recess with said finishing insert mounted therein;
- first mounting means for fixing the position of said finishing insert relative to said cartridge; and
- second mounting means for adjustably mounting said cartridge within said cartridge pocket such that by varying theposition of said cartridge relative to the cartridge pocket along said inclined floor thereof, the angle of said finishing insert relative to the planar cutting surface of said milling cutter is capable of being varied so as to exactly compensate for the tilt of said longitudinal axis of the milling cutter relative to the surface of the workpiece.

2. A milling cutter as recited in claim 1 wherein said cartridge pocket includes an upstanding arcuate rear wall and wherein said cartridge includes a complimentary arcuate rear wall engaged and abutting said arcuate rear wall of said cartridge pocket, said complimentary arcuate walls cooperating to support said cartridge in said pocket.

3. A milling cutter as recited in claim 1 wherein said finishing insert is generally square in configuration and wherein said recess formed in said cartridge includes a pair of upstanding locating rails disposed in perpendicular relationship, with said first mounting means functioning to lock said insert in said recess of said cartridge in a manner such that two side edges of said insert securely abut said locating rails of said recess.

4. A milling cutter as recited in claim 3 wherein said insert includes a central mounting hole extending therethrough and wherein said first mounting means includes a screw, said screw passing through said mounting hole formed in said insert and through an aligned aperture formed in said cartridge, with said screw being engaged in a threaded aperture formed in said floor of said cartridge pocket.

5. A milling cutter as recited in claim 1 wherein said cartridge includes at least one elongated mounting aperture having a generally arcuate configuration, said elongated aperture being positioned such that it remains aligned with a threaded aperture formed in said floor of said cartridge pocket as the position of said cartridge is varied and wherein said second mounting means includes a screw means extending through said elongated aperture in said cartridge and being engaged in said threaded aperture formed in said floor of said cartridge pocket.

6. A milling cutter as recited in claim 5 wherein said elongated aperture includes a transverse shelf portion.

7. A milling cutter as recited in claim 6 wherein said screw means of said second mounting means includes a longitudinally extending threaded shaft formed integrally with a head portion, said head portion projecting radially beyond the dimensions of said shaft, said shaft portion extending through the aligned apertures in said cartridge and floor, with said head portion of said screw abutting said transverse shelf portion of said elongated aperture thereby securing the position of said cartridge relative to said cartridge pocket.

8. A milling cutter having an adjustable finishing insert assembly, said milling cutter being generally cylindrical in configuration having a planar cutting surface, said milling cutter being rotatable about its longitudinal axis, said cutter having a plurality of indexable cutting inserts mounted around the periphery thereof adjacent the cutting surface, said assembly for adjusting the angle of said finishing insert relative to said cutting surface of said milling cutter thereby insuring that a flat cutting edge of the finishing insert may be addressed to the surface of a workpiece in order to provide a smooth cutting profile, said milling cutter comprising:
- a cartridge pocket formed in said dish cutting surface of said milling cutter and spaced radially inwardly from the periphery thereof, said cartridge pocket including a planar floor disposed at an inclined angle on the order of 10° relative to said planar cutting surface, said cartridge pocket further including an upstanding arcuate rear wall;
- a finishing insert formed from a flat wafer of cutting material and having a polygonal configuration in plan, and at least one flat cutting edge;
- a finishing insert cartridge mounted in said cartridge pocket, said cartridge having a planar bottom surface abutting said floor of said cartridge pocket, said cartridge having a recess with said finishing insert mounted therein, and with said cartridge further including a complimentary, arcuate rear wall engaged and abutting said arcuate rear wall of said cartridge pocket, said complimentary arcuate walls cooperating to support said cartridge in said cartridge pocket;
- first mounting means for fixing the position of said finishing insert relative to said cartridge; and
- second mounting means for adjustably mounting said cartridge within said cartridge pocket such that by varying the position of said cartridge relative to said cartridge pocket along said inclined floor thereof, the angle of said finishing insert relative to the planar cutting surface of said milling cutter is capable of being varied so as to exactly compensate for the tilt of said longitusinal axis of the milling cutter relative to the surface of the workpiece.

9. A milling cutter as recited in claim 8 wherein said finishing insert is generally square in configuration having a central mounting hole extending therethrough and wherein said recess in said cartridge includes a pair of upstanding locating rails disposed in perpendicular relationship and wherein said first mounting means includes a screw, said screw passing through said mounting hole formed in said insert and through an aligned aperture formed in said cartridge, with said screw being engaged in a threaded aperture formed in said floor of said cartridge pocket, said screw functioning to lock said insert within said recess of said cartridge in a manner such that two side edges of said insert securely abut said locating rails of said 10. A milling cutter as recited in claim 9 wherein said second mounting means includes at least one screw having a longitudinally extending threaded shaft formed integrally with a head portion, said head portion projecting radially beyond the dimensions of said shaft, and wherein said cartridge includes an elongated aperture having a generally arcuate configuration, said elongated aperture being positioned such that it remains aligned with a threaded aperture formed in the floor of said cartridge pocket as the position of said cartridge is varied, said elongated aperture further including a transverse shelf portion, and with said shaft portion of said screw extending through said aligned apertures in said cartridge and said floor, with the head portion of said screw abutting the transverse shelf portion of said elongated aperture thereby securing the position of said cartridge relative to said cartridge pocket.

* * * * *

UNITED STATES PATENT AND TRADEMARK OFFICE
CERTIFICATE OF CORRECTION

PATENT NO. : 4,470,731

DATED : September 11, 1984

INVENTOR(S) : Donald Spencer Erkfritz

It is certified that error appears in the above—identified patent and that said Letters Patent is hereby corrected as shown below:

In column 7, line 8, "cartirdge" should read --cartridge--.

In column 7, line 24, "theposition" should read --the position--.

In column 8, line 65, after the word "said" insert -- recess.--

Signed and Sealed this

Sixteenth Day of July 1985

[SEAL]

Attest:

DONALD J. QUIGG

Attesting Officer       Acting Commissioner of Patents and Trademarks